US012771797B2

(12) United States Patent
Namiki et al.

(10) Patent No.: US 12,771,797 B2
(45) Date of Patent: Oct. 20, 2026

(54) IMAGE READING DEVICE

(71) Applicant: SEIKO EPSON CORPORATION, Tokyo (JP)

(72) Inventors: Masaki Namiki, Kitakyushu (JP); Yudai Taruya, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 252 days.

(21) Appl. No.: 18/611,363

(22) Filed: Mar. 20, 2024

(65) Prior Publication Data

US 2024/0323295 A1 Sep. 26, 2024

(30) Foreign Application Priority Data

Mar. 22, 2023 (JP) ................................ 2023-045099

(51) Int. Cl.
*H04N 1/00* (2006.01)
*H04N 1/04* (2006.01)
*H04N 1/195* (2006.01)

(52) U.S. Cl.
CPC ..... *H04N 1/00981* (2013.01); *H04N 1/00909* (2013.01); *H04N 1/19557* (2013.01)

(58) Field of Classification Search
None
See application file for complete search history.

(56) References Cited

U.S. PATENT DOCUMENTS 5,956,161 A * 9/1999 Takashimizu ...... H04N 1/00687 358/496
2008/0239416 A1* 10/2008 Kato .................... H04N 1/1215 358/498
2008/0297857 A1* 12/2008 Ishikawa ................ H04N 1/123 358/498
2015/0055157 A1* 2/2015 Hamano ............ H04N 1/00774 358/1.12

FOREIGN PATENT DOCUMENTS

EP 3883228 9/2021
JP 2004129139 * 4/2004 ............ G03B 27/52
JP 2008-297023 A 12/2008
JP 2014-017766 1/2014

* cited by examiner

*Primary Examiner* — Beniyam Menberu
(74) *Attorney, Agent, or Firm* — WORKMAN NYDEGGER

(57) ABSTRACT

A image reading device includes a reading section configured to read an image of a medium transported in a transport direction; a light transmitting member arranged between a transport path on which the medium is transported and the reading section; and an airflow generation section which is arranged on an opposite side of the light transmitting member from the reading section, which includes a hole section positioned facing the light transmitting member, and which is configured to generate airflow from the hole section toward the light transmitting member.

20 Claims, 9 Drawing Sheets

IMAGE READING DEVICE

The present application is based on, and claims priority from JP Application Serial Number 2023-045099, filed Mar. 22, 2023, the disclosure of which is hereby incorporated by reference herein in its entirety.

BACKGROUND

1. Technical Field

The present disclosure relates to an image reading device.

2. Related Art

An example of this type of device is described in JP-A-2008-297023. JP-A-2008-297023 discloses an image reading device that includes an airflow generation unit that generates airflow in a transport path from a position upstream of an image reading unit.

The device described in JP-A-2008-297023 leaves room for improvement in terms of its capability to clean a reading surface of a reading section.

SUMMARY

In order to solve the above-described problem, an image reading device according to the present disclosure includes a reading section configured to read an image of a medium transported in a transport direction; a light transmitting member arranged between a transport path on which the medium is transported and the reading section; and an airflow generation section that is arranged on an opposite side of the light transmitting member from the reading section, that includes a hole section positioned facing the light transmitting member, and that is configured to generate airflow from the hole section toward the light transmitting member.

DESCRIPTION OF EMBODIMENTS

Figure 1:
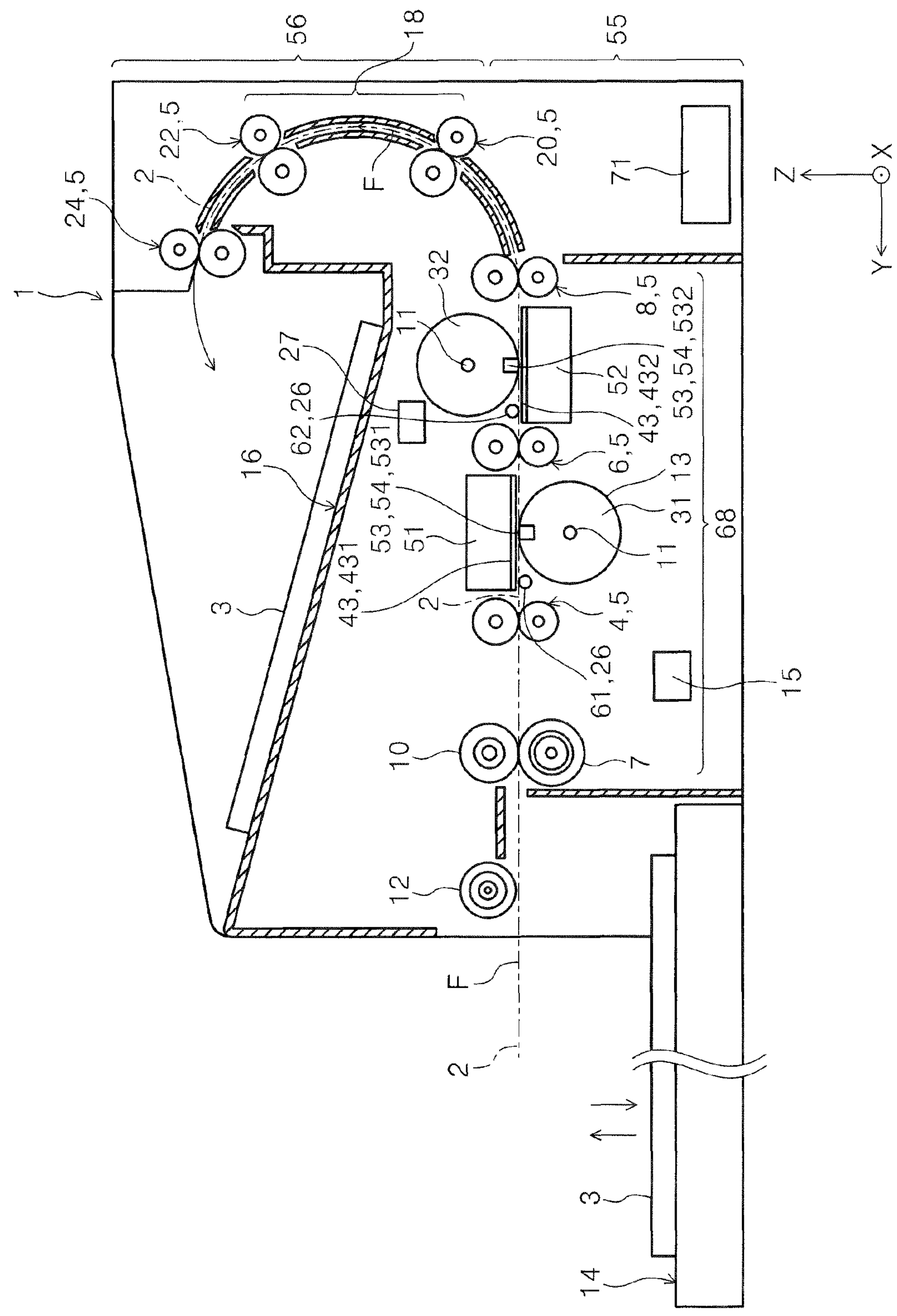
FIG. 1 is a schematic configuration view of main parts of the inside of an image reading device according to a first embodiment, as viewed from the side.

Hereinafter, the present disclosure will be briefly described.

In order to solve the above-described problem, an image reading device according to a first aspect of the present disclosure includes a reading section configured to read an image of a medium transported in a transport direction; a light transmitting member arranged between a transport path on which the medium is transported and the reading section; and an airflow generation section that is arranged on an opposite side of the light transmitting member from the reading section, that includes a hole section positioned facing the light transmitting member, and that is configured to generate airflow from the hole section toward the light transmitting member.

According to the present aspect, since the image reading device includes the airflow generation section which includes a hole section positioned facing the light transmitting member, and which is configured to generate airflow from the hole section toward the light transmitting member, the light transmitting member serving as a reading surface of the reading section can be effectively cleaned.

A second aspect of the image reading device according to the present disclosure is an aspect dependent on the first aspect, and the image reading device further includes a rotation member that is arranged to face the reading section on an opposite side of the light transmitting member from the reading section and that is configured to rotate about a shaft, wherein the airflow generation section is provided to the rotation member and the rotation member is configured to rotate and switch between a first position at which the hole section faces the light transmitting member and a second position at which the hole section stands by at a position farther from the light transmitting member than the first position.

According to the present aspect, the airflow generation section is provided on the rotation member. The rotation member is configured to rotate and switch between a first position at which the hole section is configured to blow out airflow toward the light transmitting member and a second position at which the hole section stands by at a position farther from the light transmitting member than the first position. Thus, by rotating the rotation member, the light transmitting member serving as a reading surface of the reading section can be cleaned when necessary.

A third aspect of the image reading device according to the present disclosure is an aspect dependent on the second aspect, and the rotation member includes a plurality of the hole sections in a longitudinal direction of the shaft.

According to the present aspect, since the rotation member includes a plurality of the hole sections in a longitudinal direction of the shaft, substantially uniform cleaning can be performed over the entire reading surface of the reading section in a width direction.

A fourth aspect of the image reading device according to the present disclosure is an aspect dependent on the second aspect, and at the first position, the hole section generates the airflow from a direction orthogonal to the light transmitting member.

The present aspect can also be dependent on the third aspect.

According to this aspect, the hole section blows airflow from a direction orthogonal to the light transmitting member at the first position. As a result, stronger airflow can be blown to the light transmitting member so that more effective cleaning can be performed.

A fifth aspect of the image reading device according to the present disclosure is an aspect dependent on the second aspect, and the airflow generation section overlaps the light transmitting member when viewed from a vertical direction.

The present aspect can also be dependent on the third aspect or the fourth aspect.

According to the present aspect, the airflow generation section is arranged so as to overlap the light transmitting member when viewed from the vertical direction. As a result, stronger airflow can be blown to the light transmitting member so that more effective cleaning can be performed.

A sixth aspect of the image reading device according to the present disclosure is an aspect dependent on the second aspect, and the image reading device further includes a fan configured to cause the airflow, wherein the fan is connected to the airflow generation section via a duct at a longitudinal-direction end section of the shaft.

The present aspect can also be dependent on any one of the third to fifth aspects.

According to the present aspect, the image reading device includes a fan configured to cause airflow, and the fan is connected to the airflow generation section via a duct at a longitudinal-direction end section of the shaft. As a result, the duct is connected to an end section of the rotation member in an axial direction, so that an increase in size in a height direction can be suppressed.

A seventh aspect of the image reading device according to the present disclosure is an aspect dependent on the second aspect, and the reading section includes a first reading section and a second reading section, the light transmitting member includes a first light transmitting member and a second light transmitting member, the rotation member includes a first rotation member including a first airflow generation section and a second rotation member including a second airflow generation section, the first reading section, the first light transmitting member, and the second rotation member are provided above the transport path, and the second reading section, the second light transmitting member, and the first rotation member are provided below the transport path.

The present aspect can also be dependent on any one of the third to sixth aspects.

According to the present aspect, the first reading section, the first light transmitting member, and the second rotation member are provided above the transport path, and the second reading section, the second light transmitting member, and the first rotation member are provided below the transport path. As a result, in the image reading device capable of reading both sides of the medium, the first light transmitting member and the second light transmitting member serving as the reading surface can be effectively cleaned.

An eighth aspect of the image reading device according to the present disclosure is an aspect dependent on the seventh aspect, and the image reading device further includes a lower unit and an upper unit configured to open and close relative to the lower unit, wherein the lower unit includes the second reading section, the second light transmitting member, and the first airflow generation section, the upper unit includes the first reading section, the first light transmitting member, and the second airflow generation section, in a state where the upper unit is closed, the second light transmitting member and the second airflow generation section face each other, and the first light transmitting member and the first airflow generation section face each other, and in a state where the upper unit is open, the second light transmitting member and the second airflow generation section do not face each other, and the first light transmitting member and the first airflow generation section do not face each other.

According to the present aspect, in a state where the upper unit is open, the second light transmitting member and the second airflow generation section do not face each other, and the first light transmitting member and the first airflow generation section do not face each other. As a result, the upper unit can be kept in an open state to clean the inside, thereby increasing convenience for a user.

A ninth aspect of the image reading device according to the present disclosure is an aspect dependent on the eighth aspect, and the image reading device further includes a fan as a generation source of the airflow, wherein the fan is connected to the airflow generation section via a duct at a longitudinal-direction end section of the shaft, the fan and the duct are attached to the lower unit, a first connecting section of the duct is connected to a first connected section located at a longitudinal-direction end section of the shaft of the first rotation member, a second connecting section of the duct is configured to detach and attach to be connected to a second connected section located at a longitudinal-direction end section of the shaft the second rotation member, and when the upper unit is opened with respect to the lower unit, the second connecting section separates from the second connected section while the first connecting section remains connected to the first connected section.

According to the present aspect, when the upper unit is opened with respect to the lower unit, the second connecting section separates from the second connected section while the first connecting section remains connected to the first connected section. In this configuration, the duct is connected to the upper unit and the lower unit, but the second connecting section can be separated from the second connected section, so that the upper unit can be opened, thereby facilitating maintenance.

A tenth aspect of the image reading device according to the present disclosure is an aspect dependent on the second aspect, and the image reading device further includes a first brush provided on the rotation member and configured to clean the light transmitting member, wherein when the rotating member is at the first position, the first brush is in contact with the light transmitting member, and when the rotation member is at the second position, the first brush is not in contact with the light transmitting member.

The present aspect can also be dependent on any one of the third to ninth aspects.

According to the present aspect, when the rotating member is at the first position, the first brush is in contact with the light transmitting member, and when the rotation member is at the second position, the first brush is not in contact with the light transmitting member. As a result, dust such as paper dust clinging to the light transmitting member can be cleaned by the first brush.

An eleventh aspect of the image reading device according to the present disclosure is an aspect dependent on the tenth aspect, and when the rotation member moves from the second position to the first position, the first brush comes into contact with the light transmitting member, and then the hole section passes through a position facing the light transmitting member.

According to the present aspect, when the rotation member moves from the second position to the first position, the first brush comes into contact with the light transmitting member, and then the hole section passes through a position facing the light transmitting member. As a result, after the light transmitting member is cleaned by the first brush, the airflow blown out from the hole section allows more effective cleaning.

A twelfth aspect of the image reading device according to the present disclosure is an aspect dependent on the second aspect, and the rotation member includes a white background section and a black background section at positions different from the hole section, and when the medium is to be read, the rotation member rotates to position the white background section or the black background section to face the light transmitting member.

The present aspect can also be dependent on any one of the third to eleventh aspects.

According to the present aspect, when the medium is read, the rotation member rotates to position so that the white background section or the black background section faces the light transmitting member. As a result, it is possible to switch between the white background section and the black background section in accordance with the type of the medium.

A thirteenth aspect of the image reading device according to the present disclosure is an aspect dependent on the twelfth aspect, and the hole section is arranged between the white background section and the black background section in the transport direction when the rotation member is at the first position.

According to the present aspect, the hole section is arranged between the white background section and the black background section in the transport direction when the rotation member is at the first position. As a result, after the light transmitting member is cleaned by the airflow, whichever of the white background section and the black background section is made to face the light transmitting member by rotating the rotation member, the white background section and the black background section can be positioned by substantially the same rotation amount.

A fourteenth aspect of the image reading device according to the present disclosure is an aspect dependent on the second aspect, and the rotation member includes a rotation white background section configured to rotate about a first rotation shaft different from the shaft and a rotation black background section configured to rotate about a second rotation shaft different from the shaft and the first rotation shaft at a position different from the hole section, and when the medium is read, the rotation member rotates to position so that the rotation white background section or the rotation black background section faces the light transmitting member.

The present aspect can also be dependent on any one of the third to thirteenth aspects.

According to the present aspect, when an image of the medium is read, the rotation member rotates to position so that the rotation white background section or the rotation black background section faces the light transmitting member. As a result, since the rotation white background section and the rotation black background section come into contact with a transported medium while rotating, it is possible to stabilize a transportation of the medium at the time of reading by the reading section, and thus, reading quality is stabilized.

A fifteenth aspect of the image reading device according to the present disclosure is an aspect dependent on the second aspect, and the image reading device further includes a color reference member provided on the rotation member and configured to have a uniform reflectance and a second brush configured to clean the color reference member, wherein the second brush cleans the color reference member when the rotation member rotates and comes into contact with the color reference member.

The present aspect can also be dependent on any one of the third to fourteenth aspects.

According to the present aspect, the second brush cleans the color reference member when the rotation member rotates and comes into contact with the color reference member. As a result, dust such as paper dust clinging to the color reference member can be cleaned by the second brush.

A sixteenth aspect of the image reading device according to the present disclosure is an aspect dependent on the fifteenth aspect, and the color reference member is arranged on an opposite side of the shaft from the hole section.

According to the present aspect, since the color reference member is arranged on an opposite side of shaft from the hole section, dirt such as dust blown by the airflow is less likely to be contaminated as compared with a case where the color reference member is arranged on another section.

A seventeenth aspect of the image reading device according to the present disclosure is an aspect dependent on the seventh aspect, and at least a part of the first reading section overlaps the second rotation member when viewed from the transport direction and at least a part of the second reading section overlaps the first rotation member when viewed from the transport direction.

The present aspect can also be dependent on the eighth aspect or the ninth aspect.

According to the present aspect, at least a part of the first reading section overlaps the second rotation member when viewed from the transport direction, and at least a part of the second reading section overlaps the first rotation member when viewed from the transport direction. That is, since the first reading section and the second reading section are not arranged so as to face each other in the vertical direction, but are arranged so as to be offset from each other, it is possible to arrange the first rotation member and the second rotation member on the facing sides of the first reading section and the second reading section, thereby suppressing an increase in the size in a height direction.

An eighteenth aspect of the image reading device according to the present disclosure is an aspect dependent on the seventh aspect, and the first rotation member and the second rotation member are rotated by a common drive source.

The present aspect can also be dependent on the eighth aspect or the ninth aspect.

According to the present aspect, since the first rotation member and the second rotation member use a common motor as a drive source for rotation, it is possible to suppress increase in size compared to a case where separate motors are used.

A nineteenth aspect of the image reading device according to the present disclosure is an aspect dependent on the fourteenth aspect, and the airflow generation section includes another hole section, and generates airflow from the other hole section toward the rotation white background section and the rotation black background section when the rotation member is at the second position.

The present aspect can also be dependent on any one of the third to thirteenth aspects.

According to this aspect, the airflow generation section generates airflow from the other hole section toward the rotation white background section and the rotation black background section when the rotation member is at the second position. As a result, paper dust clinging to the rotation white background section and the rotation black background section can be removed.

A twentieth aspect of the image reading device according to the present disclosure is an aspect dependent on the tenth aspect, and the image reading device further includes a transport assistance section that faces the light transmitting member, that is arranged upstream of the rotation member, and that assists transport of the medium, wherein the first brush is configured to come into contact with the transport assistance section at a position different from the first position and the second position of the rotation member and to clean the transport assistance section.

According to the present aspect, the first brush is configured to come into contact with the transport assistance section at a position different from the first position and the second position of the rotation member and clean the transport assistance section. As a result, the transport assistance section can be cleaned by using the first brush provided on the rotation member.

A twenty first aspect of the image reading device according to the present disclosure is an aspect dependent on the second aspect, and the image reading device further includes a transport assistance section that faces the light transmitting member, that is arranged upstream of the rotation member, and that assists transport of the medium, wherein when the rotation member is at a third position different from the first position and the second position, the airflow generation section is configured such that the hole section faces the transport assistance section and the transport assistance section is configured be cleaned by airflow blown out from the hole section.

The present aspect can also be dependent on any one of the third to twentieth aspects.

According to the present aspect, when the rotation member is at a third position different from the first position and the second position, the airflow generation section is configured such that the hole section faces the transport assistance section and the transport assistance section is configured be cleaned by airflow generated from the hole section. As a result, the airflow generation section can clean the transport assistance section.

A twenty second aspect of the image reading device according to the present disclosure is an aspect dependent on the second aspect, and the transport path includes a straight path in which the reading section is arranged, and a curved inversion path located downstream of the straight path and a discharge receiving section that receives the medium discharged from the curved inversion path is arranged above the straight path.

The present aspect can also be dependent on any one of the third to twenty first aspects.

According to the present aspect, the transport path includes a straight path, and a curved inversion path and a discharge receiving section that receives the medium discharged from the curved inversion path is arranged above the straight path. As a result, it is possible to suppress an increase in the size of the device in a height direction.

A twenty third aspect of the image reading device according to the present disclosure is an aspect dependent on the seventh aspect, and the first rotation member and the second rotation member rotate in a same rotational direction when they rotate in a state where the airflow is generated from the hole section.

The present aspect can also be dependent on the eighth aspect or the ninth aspect.

According to the present aspect, the first rotation member and the second rotation member rotate in a same rotational direction when they rotate in a state where the airflow is generated from the hole section. As a result, it is possible to suppress dust blown by the airflow from clinging to the reading section on one side.

EMBODIMENT

Hereinafter, an embodiment of an image reading device according to the present disclosure will be described in detail with reference to FIG. 1 to FIGS. 6A and 6B.

In the following description, three axes orthogonal to each other are referred to as an X-axis, a Y-axis, and a Z-axis, as shown in the drawings. A direction indicated by arrows of three axes (X, Y, Z) is a + direction of each direction, and the reverse is a − direction. A Z-axis direction corresponds to the vertical direction, that is, a direction in which gravity acts, and a +Z direction indicates the vertically upward direction and a −Z direction indicates the vertically downward direction. A X-axis direction and a Y-axis direction correspond to the horizontal direction. A +Y direction indicates a forward direction of a device and a −Y direction indicates a backward direction of the device. A +X direction indicates a right direction of the device, and the −X direction indicates a left direction of the device.

First Embodiment

Overall Structure of Image Reading Device

An image reading device 1 of the present embodiment is a scanner capable of reading an image of a medium serving as a document. Here, the image is visually recorded on the medium, for example, a character, a figure, a table, a picture, a photograph, or the like. The medium is not limited to a sheet, but includes a card, a booklet, and the like.

As shown in FIG. 1, the image reading device 1 includes a first reading section 51 and a second reading section 52 that read an image of a medium 3, a first transport roller 4 that transports the medium 3 along a transport path 2 in a transport direction F and provided upstream of the first reading section 51 in the transport direction F, a second transport roller 6 provided upstream of the second reading section 52 located downstream of the first reading section 51, and a third transport roller 8 provided downstream of the second reading section 52.

A roller pair of a feed roller 10 and a separation roller 7 is arranged upstream of the first transport roller 4 in the transport direction F. The feed roller 10 is a drive roller rotated by the power of a first drive source 15, and transports the medium 3 in the transport direction F. The separation roller 7 is a drive roller that is rotated by the power of a drive source (not shown), and separates a plurality of sheets of the medium 3 into one sheet.

Here, the separation roller 7 rotates in a rotational direction for feeding the medium 3 to an upstream side (+Y direction) of the transport direction F by the power of the drive source. The separation roller 7 includes a torque limiter (not shown), and when a torque exceeding a set value is applied to the torque limiter, the separation roller 7 is driven to rotate in a rotational direction for feeding the medium 3 to a downstream side (−Y direction) in the transport direction F.

A pickup roller 12 is arranged upstream of the separation roller 7. The pickup roller 12 is a drive roller that is rotated by the power of the first drive source 15 which is the same as that of the feed roller 10, and transports the medium 3 in the transport direction F. The first transport roller 4, the second transport roller 6, and the third transport roller 8 constituting the transport section 5 that transports the medium 3 in the transport direction F are also provided with drive rollers rotated by the power of the first drive source 15.

As shown in FIG. 1, in the present embodiment, a curved inversion path 18 is provided downstream of a straight path 68 from the feed roller 10 to the third transport roller 8, that is, downstream of the third transport roller 8. In the curved inversion path 18, the fourth transport roller 20, the fifth transport roller 22, and the discharge roller 24 are arranged in this order along the transport direction F.

The discharge receiving section 16 that receives the medium 3 discharged from the curved inversion path 18 is arranged above the straight path 68 to achieve a compact configuration.

In FIG. 1, reference numeral 71 denotes a control section. The control section 71 controls the drive of the first drive source 15 and the drive of the second drive source 27 described later in correspondence with the transport of the medium 3. The first drive source 15 and the second drive source 27 are constituted by motors. The control section 71 includes a CPU, a flash ROM, and a RAM. The CPU performs various kinds of arithmetic processing in accordance with a program stored in the flash ROM and controls operation of the entire image reading device 1. A flash ROM, which is an example of storage unit, is a nonvolatile memory capable of reading and writing. Various kinds of information are temporarily stored in the RAM, which is an example of the storage unit.

In FIG. 1, reference numeral 14 denotes a medium placement section for setting the medium 3 to be read, and reference numeral 16 denotes a discharge receiving section for discharging the medium 3 that has been read.

The medium placement section 14 is configured to move vertically. In a case where the medium 3 that is set on the medium placement section 14 is fed in the transport direction F, first, the medium placement section 14 moves upward (+Z direction), and stops in a state where the uppermost sheet of the set medium 3 is in contact with the pickup roller 12. In this state, the pickup roller 12 rotates to feed the medium 3 in the transport direction F, and a leading edge of the medium 3 reaches a nip position of a roller pair of the feed roller 10 and the separation roller 7.

In a case of a multi-feed state in which the medium 3 is fed in a plurality of sheets, the medium 3 is separated into one sheet by the separation roller 7, the one sheet is transported in the transport direction F by the first transport roller 4, and the image on a first surface of the medium 3 is read by the first reading section 51. Further, the medium 3 read by the first reading section 51 is transported by the second transport roller 6, and an image of a second surface opposite to the first surface of the medium 3 is read by the second reading section 52.

The medium 3 read by the second reading section 52 is fed to the curved inversion path 18 by the third transport roller 8, transported by the fourth transport roller 20 and the fifth transport roller 22, and discharged to the discharge receiving section 16 by the discharge roller 24.

Light Transmitting Member and Airflow Generation Section

As shown in FIG. 1, FIGS. 3A and 3B, FIG. 4, and FIGS. 6A and 6B, in the present embodiment, the image reading device includes the first reading section 51 and a second reading section 52 as reading sections for reading an image of the medium 3 transported in the transport direction F, and a first light transmitting member 431 and a second light transmitting member 432 as light transmitting members 43 arranged between the transport path 2 on which the medium 3 is transported and the first reading section 51 and the second reading section 52.

Figure 6A:
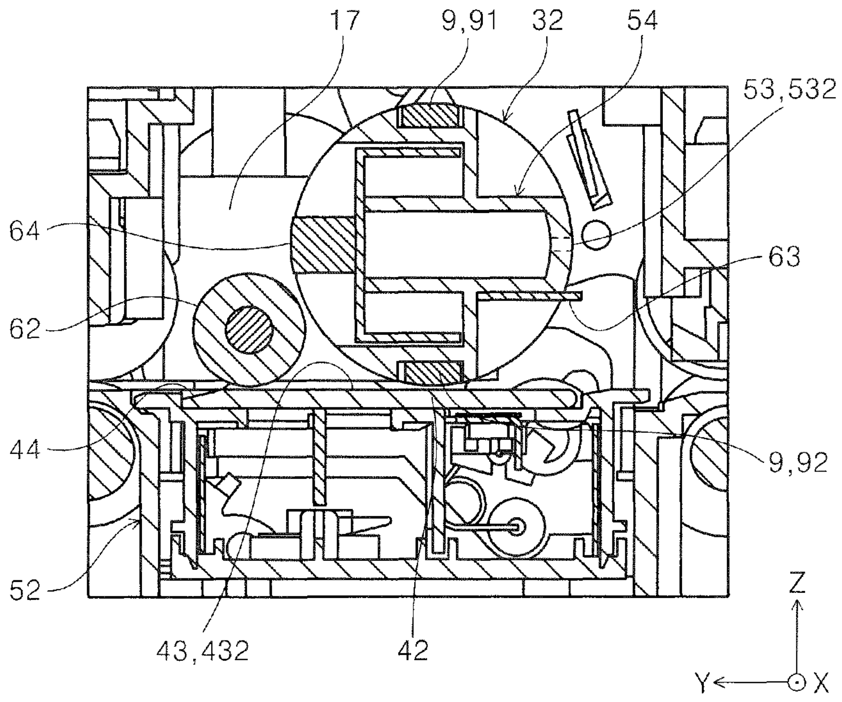
FIGS. 6A and 6B are side cross-sectional views of a main part of the first embodiment.
Figure 6B:
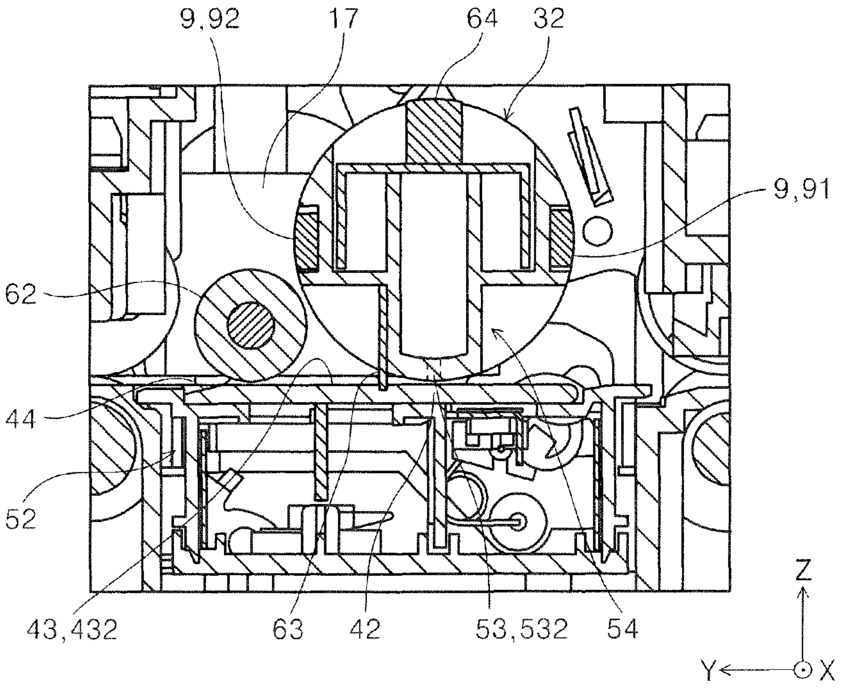

In FIGS. 6A and 6B, reference numeral 42 denotes a reading position of the second reading section 52, and reference numeral 44 denotes an inclined surface. The inclined surface 44 is provided at an upstream end section of the light transmitting member 43 on the reading surface side, and guides a leading edge of the medium 3 along the transport path 2.

Further, on the opposite side of the first light transmitting member 431 and the second light transmitting member 432 from the first reading section 51 and the second reading section 52, the airflow generation sections 54 and 54 are arranged to face the first reading section 51 and the second reading section 52. The airflow generation sections 54 and 54 include hole sections 53 and 53 positioned to face the first light transmitting member 431 and the second light transmitting member 432, and can generate airflow from the hole sections 53 and 53 to the first light transmitting member 431 and the second light transmitting member 432.

In the present embodiment, the airflow generation section 54 is configured to blow out airflow from the hole sections 53 to the outside and apply the airflow to the light transmitting member 43.

Here, the airflow generation section 54 is configured such that when a power supply of the image reading device 1 is turned on, a fan 45 (to be described later) is driven to blow out airflow from the hole sections 53. The timing at which airflow is blown out from the hole sections 53 is not limited to the time when the power supply is turned on, and may be performed at an appropriate timing such as after the image of the medium 3 is read by the reading sections 51 and 52 and after jam of the medium 3 in the transport path 2 is processed. Alternatively, a sensor such as an encoder that detects contamination of the first light transmitting member 431 and the second light transmitting member 432 may be provided, and airflow may be blown out based on sensing information of the sensor. Alternatively, a switch for generating airflow may be provided, and the switch may be turned on by a user's judgment to blow out the airflow.

Rotation Member

The first rotation member 31 and the second rotation member 32 are arranged on the opposite sides of the first light transmitting member 431 and the second light transmitting member 432 from the first reading section 51 and the second reading section 52. The first rotation member 31 and the second rotation member 32 are rotation members that are arranged to face the first reading section 51 and the second reading section 52 and that are rotatable about the shaft 11.

The airflow generation sections 54 are provided in the first rotation member 31 and the second rotation member 32. The first rotation member 31 and the second rotation member 32 are configured so as to be rotatable and switchable between a first position P1 (FIG. 6B) at which airflow can be generated by directing the hole sections 53 toward the first light transmitting member 431 and the second light transmitting member 432, and at which airflow can be blown out, and a second position P2 (FIG. 6A) at which the hole sections 53 can stand by at a position farther from the first light transmitting member 431 and the second light transmitting member 432 than the first position P1. The second position P2 may be a position rotated 180 degrees from the position shown in FIG. 6A.

The control section 71 determines whether the hole sections 53 are located at the first position P1 or the second position P2 based on information from a sensor (not shown) that detects the rotational positions in the rotational directions of the first rotation member 31 and the second rotation member 32, and the control section 71 stops the hole sections 53 at the first position P1 or the second position P2.

As shown in FIG. 1, the hole sections 53 of the first rotation member 31 located at the first position P1 is located at a position overlapping the first transport roller 4 when viewed from the transport direction F. The hole sections 53 of the second rotation member 32 located at the first position P1 may be located at a position overlapping the second transport roller 6 when viewed from the transport direction F. The hole sections 53 located at the first position P1 may be located at a position overlapping both the first transport roller 4 and the second transport roller 6 when viewed from the transport direction F.

The hole sections 53 of the first rotation member 31 located at the first position P1 are located between the shaft 11 and the first light transmitting member 431 when viewed from an axial direction of the shaft 11. The hole sections 53 of the second rotation member 32 located at the first position P1 are located between the shaft 11 and the second light transmitting member 432 when viewed from an axial direction of the shaft 11. The axial direction of the shaft 11 may be referred to as a longitudinal direction of the shaft 11. The axial direction of the shaft 11 may be referred to as a direction orthogonal to the vertical direction and the transport direction F.

As shown in FIG. 1, the first rotation member 31 includes a first airflow generation section 531 as the airflow generation section 54, and the second rotation member 32 includes a second airflow generation section 532 as the airflow generation section 54.

The first reading section 51, the first light transmitting member 431, and the second rotation member 32 are arranged above the transport path 2. The second reading section 52, the second light transmitting member 432, and the first rotation member 31 are arranged below the transport path 2.

At least a part of the first reading section 51 overlaps the second rotation member 32 when viewed from the transport direction F, and at least a part of the second reading section 52 also overlaps the first rotation member 31 when viewed from the transport direction F.

Figure 5:
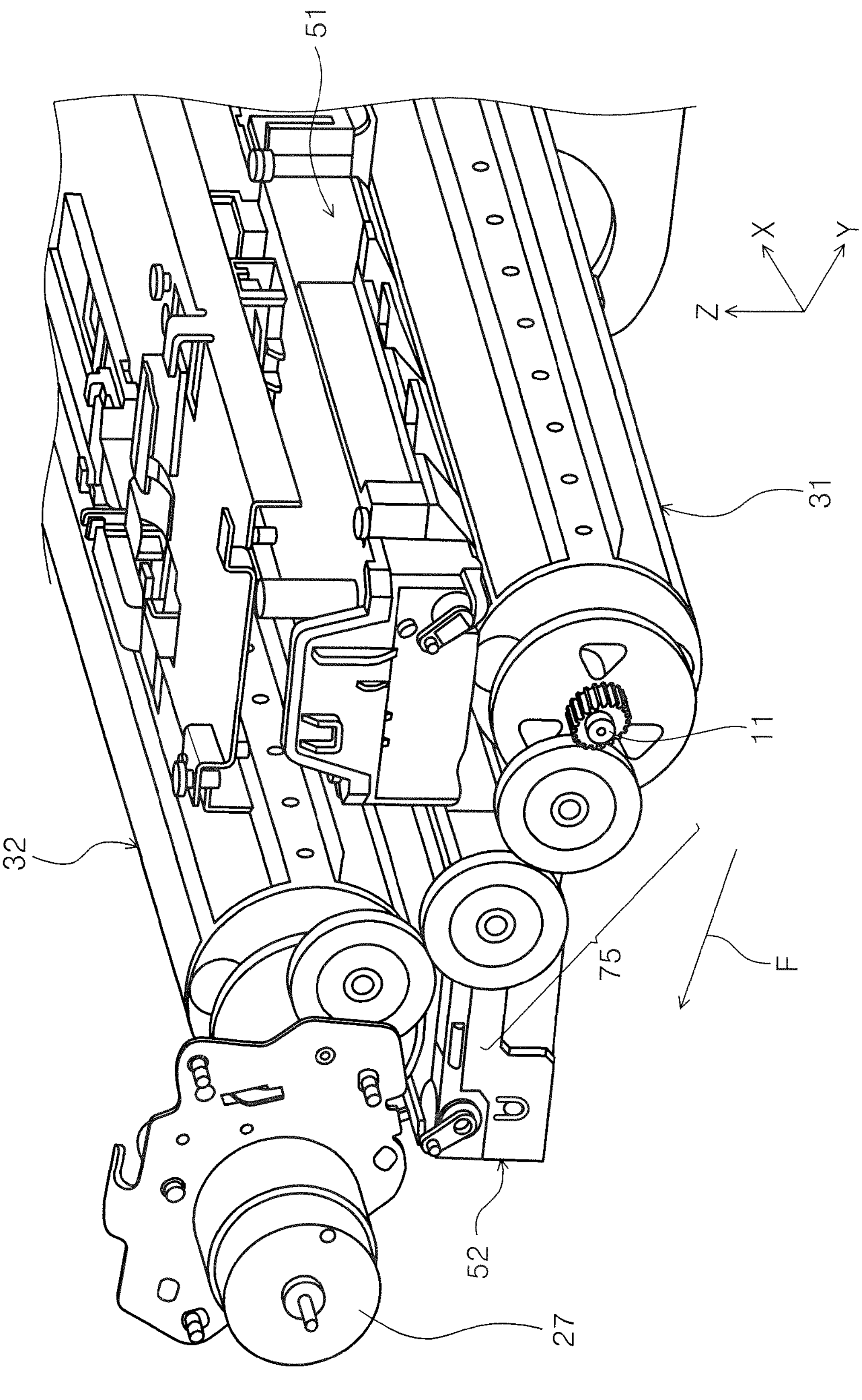
FIG. 5 is a perspective view of a main part of the first embodiment.

As shown in FIG. 5, the first rotation member 31 and the second rotation member 32 are rotated about the shaft 11 by the power of the second drive source 27 which is a common drive source. In FIG. 5, reference numeral 75 denotes a power transmission mechanism. The second drive source 27 transmits power to the first rotation member 31 and the second rotation member 32 via the power transmission mechanism 75 to rotate them. The first rotation member 31 and the second rotation member 32 may be configured to rotate by the power of individual motors instead of the common second drive source 27.

The first rotation member 31 and the second rotation member 32 are controlled by the control section 71 so as to rotate in the same rotational direction when the first rotation member 31 and the second rotation member 32 are rotated while airflow is blown out from the hole sections 53.

Figure 3A:
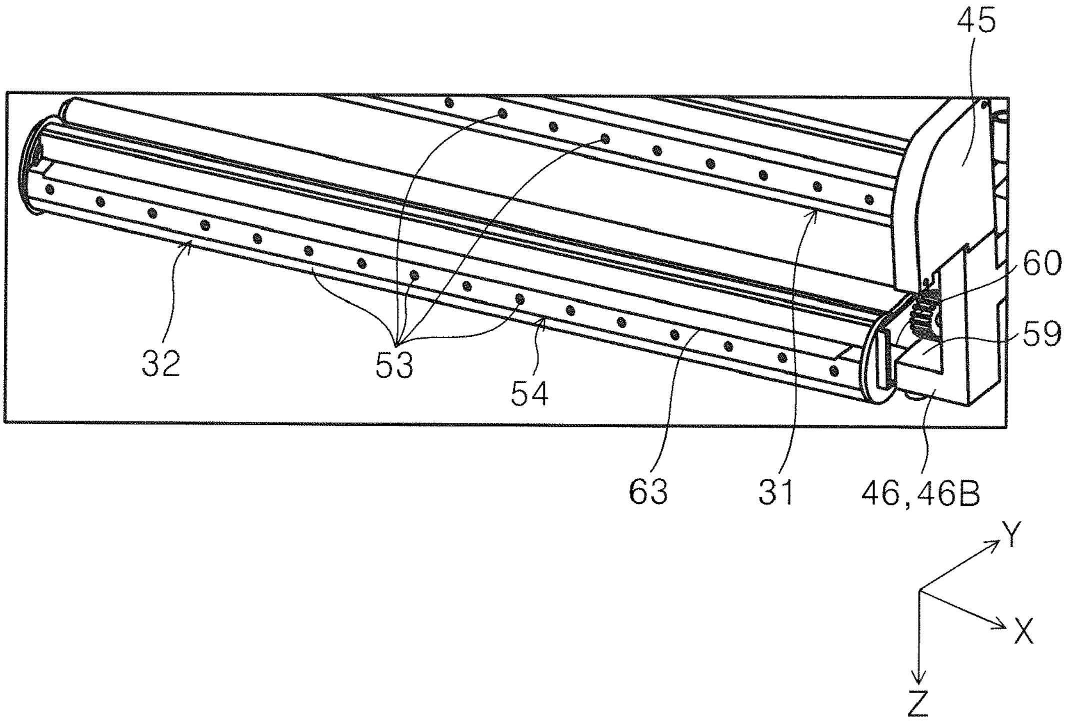
FIGS. 3A and 3B are a perspective view of a main part and a partially enlarged view of the first embodiment.
Figure 3B:
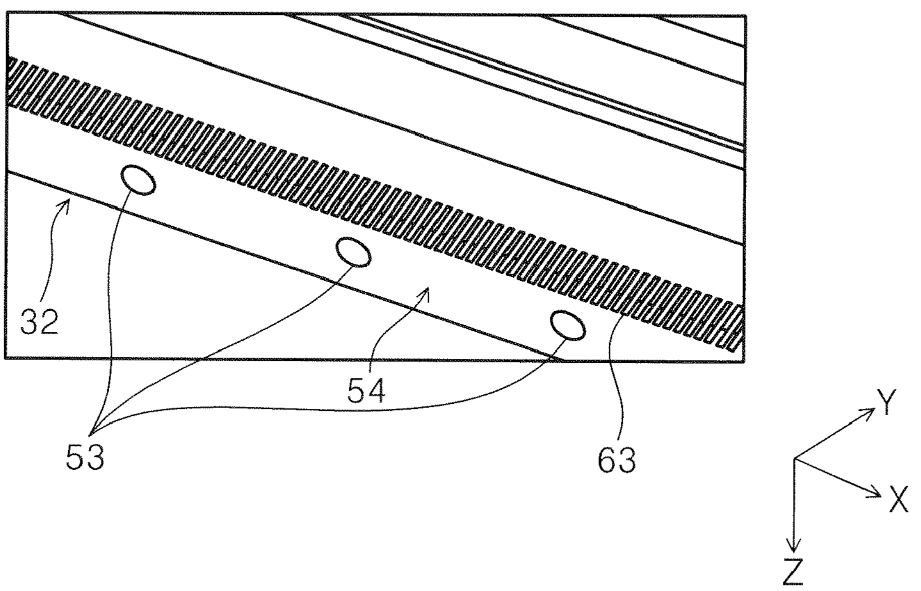
Figure 4:
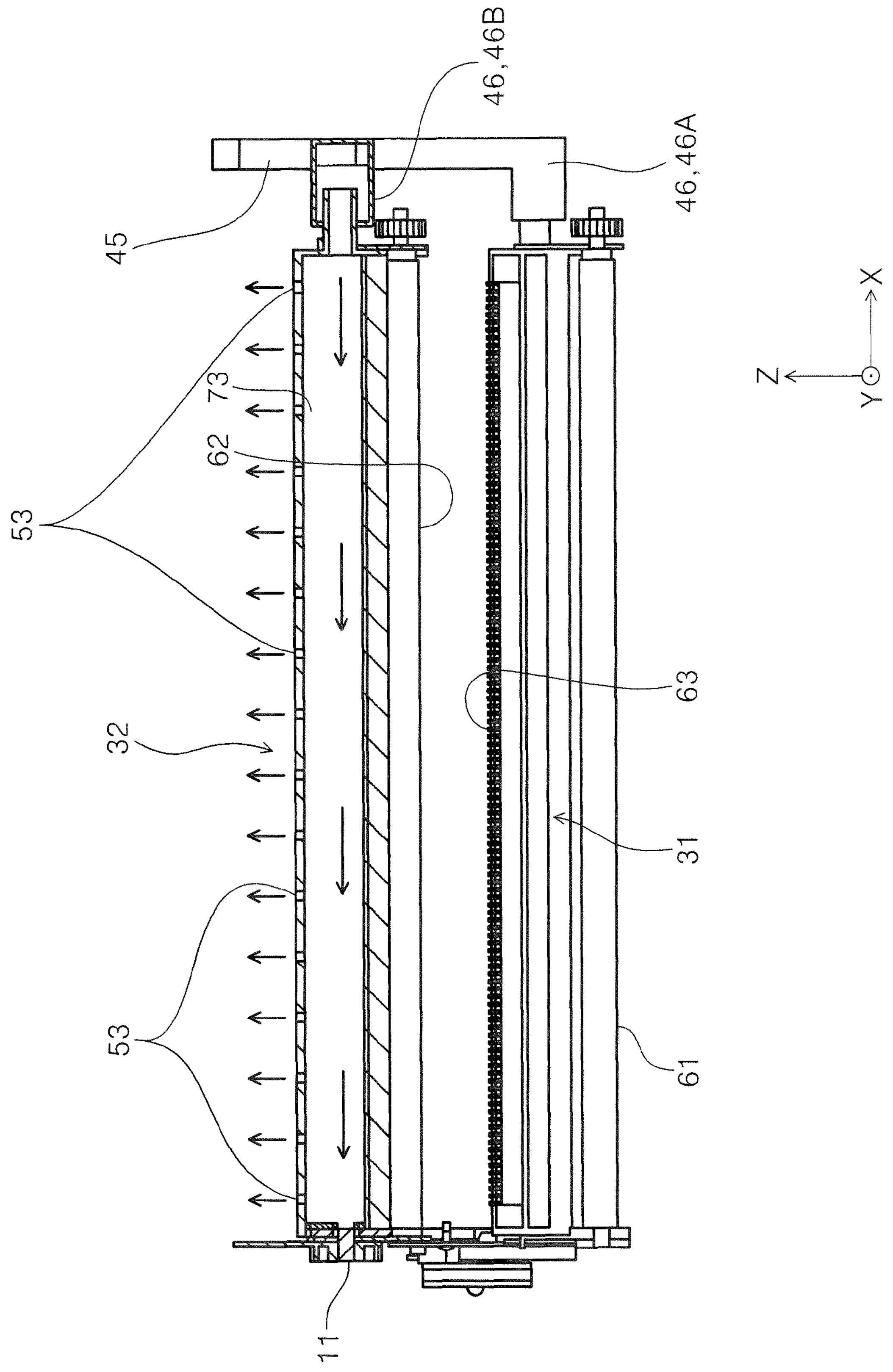
FIG. 4 is a front view of a main part of the first embodiment, with a part thereof in cross section.

In the present embodiment, as shown in FIGS. 3A, 3B and 4, the first rotation member 31 and the second rotation member 32 include a plurality of hole sections 53 in the longitudinal direction of the shaft 11. A plurality of hole sections 53 may be provided in the transport direction F. Alternatively, a plurality of the hole sections 53 may be provided in the direction of the shaft 11 and in the transport direction F.

At the first position P1, the hole sections 53 are configured to blow airflow from a direction orthogonal to the first light transmitting member 431 and the second light transmitting member 432. The airflow is not limited to be orthogonal to the target, and may be obliquely blown to the target. The first rotation member 31 and the second rotation member 32 may be rotated while blowing the airflow, or may be blown in a stopped state.

The first airflow generation section 531 and the second airflow generation section 532 are arranged so as to overlap the first light transmitting member 431 and the second light transmitting member 432, respectively, when viewed from the vertical direction. As shown in FIG. 1, the shafts 11 of the first rotation member 31 and the second rotation member 32 are arranged so as to overlap the first reading section 51 and the second reading section 52, respectively, when viewed from the vertical direction. The shafts 11 of the first rotation member 31 and the second rotation member 32 are arranged so as to overlap the first light transmitting member 431 and the second light transmitting member 432, respectively, when viewed in the vertical direction.

As shown in FIG. 1, in the present embodiment, the image reading device 1 includes a lower unit 55 and an upper unit 56. The upper unit 56 is configured to be capable of opening and closing by being rotated in the vertical direction with respect to the lower unit 55 by an opening and closing mechanism (not shown).

The lower unit 55 includes the second reading section 52, the second light transmitting member 432, and the first airflow generation section 531. The upper unit 56 includes the first reading section 51, the first light transmitting member 431, and the second airflow generation section 532. In a state in which the upper unit 56 is closed with respect to the lower unit 55, as shown in FIG. 1, the second light transmitting member 432 and the second airflow generation section 532 are arranged to face each other, and the first light transmitting member 431 and the first airflow generation section 531 are arranged to face each other. In a state where the upper unit 56 is open with respect to the lower unit 55, the second light transmitting member 432 and the second airflow generation section 532 do not face each other, and the first light transmitting member 431 and the first airflow generation section 531 do not face each other, although not shown. That is, facing surfaces of the lower unit 55 and the upper unit 56 become exposed, and a user can access the facing surfaces.

Fan, Duct

Figure 2:
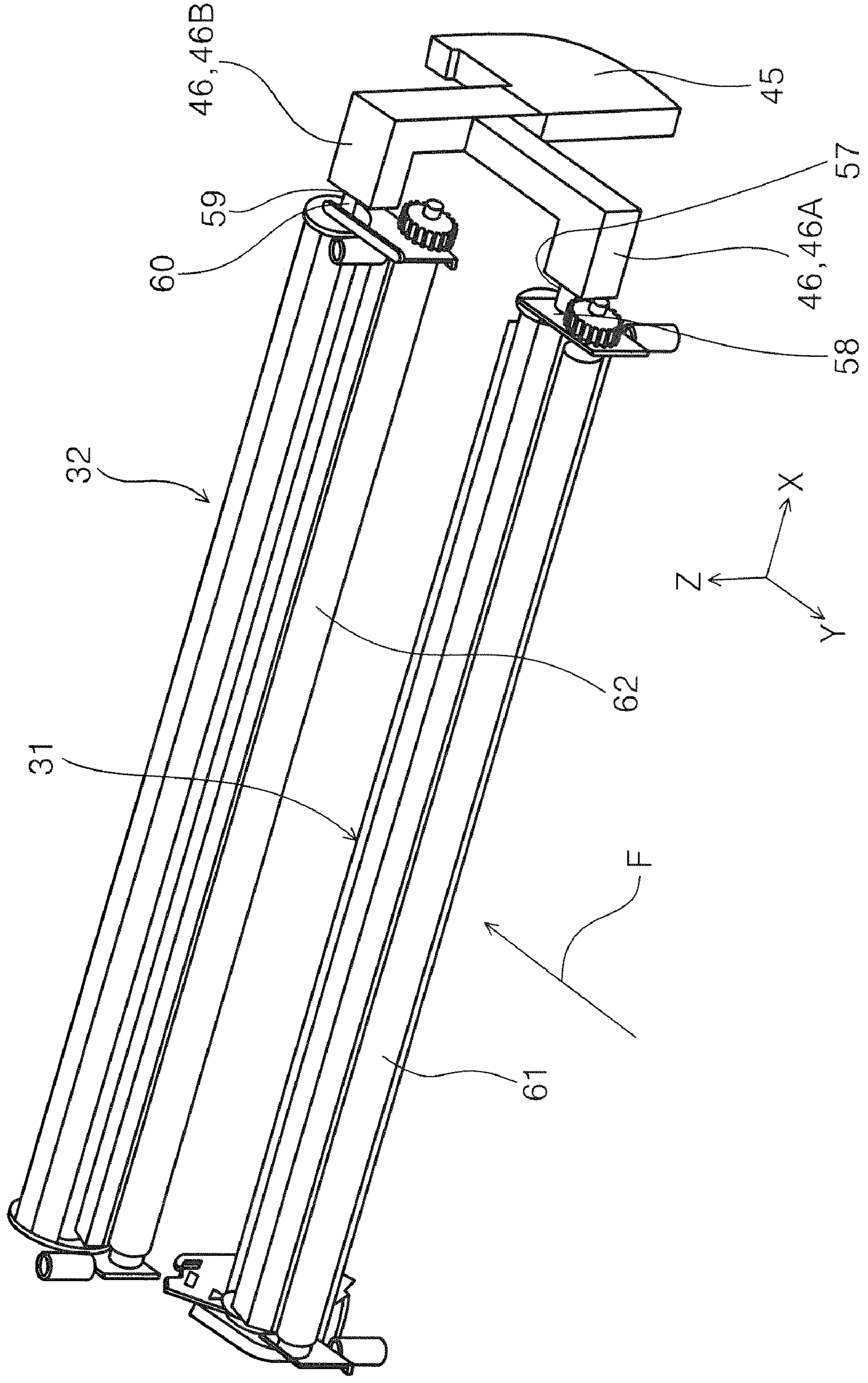
FIG. 2 is a perspective view of a main part of the first embodiment.

As shown in FIGS. 2 to 4, in the present embodiment, a fan 45 for generating the airflow is provided. The fan 45 is connected to the first airflow generation section 531, the second airflow generation section 532, and a first duct 46A and a second duct 46B, which are the ducts 46 at respective longitudinal-direction end sections of the shafts 11. The first rotation member 31 and the second rotation member 32 basically have a cylindrical shape, and the airflow generated by the fan 45 passes through internal space sections 73 of the first rotation member 31 and the second rotation member 32, and is blown out to the outside from the hole sections 53 as shown in FIG. 4.

The fan 45 and the duct 46 are attached to the lower unit 55. Specifically, as shown in FIG. 2, a first connecting section 57 of the first duct 46A, which is the duct 46, is connected to a first connected section 58 located at a longitudinal-direction end section of the shaft 11 of the first rotation member 31. A second connecting section 59 of the second duct 46B is connected to a second connected section 60 located at a longitudinal-direction end section of the shaft 11 of the second rotation member 32. When the upper unit 56 is opened with respect to the lower unit 55, the second connecting section 59 separates from a second connected section 60 while the first connecting section 57 remains connected to a first connected section 58.

First Brush

As shown in FIGS. 3A, 3B, 4, 6A and 6B, in the present embodiment, the first rotation member 31 and the second rotation member 32 are provided with respective first brushes 63. The first brushes 63 clean the first light transmitting member 431 and the second light transmitting member 432. The first brushes 63 are configured so as to be in contact with corresponding ones of the first light transmitting member 431 and the second light transmitting member 432, when the first rotation member 31 and the second rotation member 32 are at the first position P1 (FIG. 6B), and so as not to be in contact with the first light transmitting member 431 and the second light transmitting member 432 when the first rotation member 31 and the second rotation member 32 are at the second position (FIG. 6A).

In the present embodiment, by the first rotation member 31 and the second rotation member 32 move from the second position P2 (FIG. 6A) to the first position P1 (FIG. 6B), the first brushes 63 come into contact with the first light transmitting member 431 and the second light transmitting member 432, and then the hole sections 53 of the airflow generation sections 54 pass through a position facing the first light transmitting member 431 and the second light transmitting member 432, so that cleaning by the airflow is performed after cleaning by the first brushes 63.

The light transmitting member 43 may be cleaned by the airflow and then cleaned by the first brush 63. The first brush 63 is not limited to the position shown in FIG. 6B, that is, a position on an upstream side of the hole sections 53, but may be arranged on a downstream side which is a symmetrical position opposite to the hole sections 53. The contact angle of the first brush 63 with respect to the light transmitting member 43 is not necessarily a right angle as shown in FIG. 6B, but may be inclined.

Background Section

As shown in FIGS. 6A and 6B, in the present embodiment, each of the first rotation member 31 and the second rotation member 32 is provided with a white background section 91 and a black background section 92 as a background section 9 on a peripheral surface 13 (FIG. 1) at positions different from the hole sections 53. When the first reading section 51 and the second reading section 52 read the image of the medium 3, by the rotation, the white background section 91 or the black background section 92 is positioned so as to face the first light transmitting member 431 and the second light transmitting member 432, respectively.

When the first rotation member 31 and the second rotation member 32 are at the first position P1 (FIG. 6B), each of the hole sections 53 of each of the airflow generation sections 54 is arranged between the white background section 91 and the black background section 92 in the transport direction F.

As shown in FIG. 1, FIG. 2, FIG. 4, and FIGS. 6A and 6B, in the present embodiment, a first transport assistance section 61 and a second transport assistance section 62 are provided as transport assistance sections that face the first light transmitting member 431 and the second light transmitting member 432, are arranged upstream of the first rotation member 31 and the second rotation member 32, and assist transport of the medium 3. Here, the first transport assistance section 61 and the second transport assistance section 62 are constituted by drive rollers 26, which are referred to as platen rollers 26, to which the power of the first drive source 15 is transmitted to rotate.

The first brush 63 is configured such that the first rotation member 31 and the second rotation member 32 come into contact with the first transport assistance section 61 and the second transport assistance section 62 at a position different from the first position P1 (FIG. 6B) and the second position P2 (FIG. 6A), and the first brushes 63 can clean the first transport assistance section 61 and the second transport assistance section 62. Here, a position different from the first position P1 and the second position P2 is a position in a state in which the first rotation member 31 and the second rotation member 32 further rotate clockwise from the second position P2 (FIG. 6A), pass through the first position P1, and the first brushes 63 come into contact with the first transport assistance section 61 and the second transport assistance section 62.

The cleaning operation is performed in a state in which the platen roller 26 is driven by the first drive source 15 and the first rotation member 31 and the second rotation member 32 are stopped for cleaning.

However, the present disclosure is not limited to this. The platen rollers 26 may be rotated at higher speeds than the rotated first rotation member 31 and rotated the second rotation member 32, in other words, the first rotation member 31 and the second rotation member 32 may clean in a state of being rotated slowly. By rotating both of them for cleaning, it is possible to prevent dust from remaining on the first brush 63, and the first brush 63 is less likely to be worn.

Description of Effects of First Embodiment (1) According to the present embodiment, the light transmitting member 43 serving as the reading surface of the reading sections 51 and 52 can be effectively cleaned because of the airflow generation section 54, which includes the hole section 53 positioned facing the light transmitting member 43 and which is configured to blow airflow from the hole section 53 toward the light transmitting member 43.

(2) According to the present embodiment, the airflow generation sections 54 are provided in the rotation members 31 and 32. The rotation members 31 and 32 are configured to rotate and switch between the first position P1 at which the hole section 53 is configured to blow out airflow toward the light transmitting member 43 and a second position P2 at which the hole section 53 stands by at a position farther from the light transmitting member 43 than the first position P1. As a result, by rotating the rotation members 31 and 32, the light transmitting members 43, which serve as the reading surface of the reading sections 51 and 52, can be cleaned when necessary.

(3) According to the present embodiment, since the rotation members 31 and 32 include a plurality of hole sections 53 in the longitudinal direction of the shaft 11, it is possible to perform substantially uniform cleaning over the entire reading surfaces of the reading sections 51 and 52 in the width direction.

(4) According to the present embodiment, the hole section 53 blows airflow from a direction orthogonal to the light transmitting member 43 at the first position P1. As a result, stronger airflow can be blown to the light transmitting member 43, so that more effective cleaning can be performed.

(5) According to the present embodiment, the airflow generation section 54 is arranged so as to overlap the light transmitting member 43 when viewed from the vertical direction. As a result, stronger airflow can be blown to the light transmitting member 43, so that more effective cleaning can be performed.

(6) According to the present embodiment, the fan 45 for generating the airflow is provided, and the fan 45 is connected to the airflow generation section 54 by the duct 46 at the longitudinal-direction end section of the shaft 11. As a result, the duct 46 is connected to the end sections of the rotation members 31 and 32 in the direction of the shaft 11, so that it is possible to suppress an increase in size in the height direction.

(7) According to the present embodiment, the first reading section 51, the first light transmitting member 431, and the second rotation member 32 are provided above the transport path 2, and the second reading section 52, the second light transmitting member 432, and the first rotation member 31 are provided below the transport path 2. As a result, in the image reading device 1 capable of reading both sides of the medium 3, the first light transmitting member 431 and the second light transmitting member 432 serving as the reading surfaces can be effectively cleaned.

(8) According to the present embodiment, in a state where the upper unit 56 is open, the second light transmitting member 432 and the second airflow generation section 532 do not face each other, and the first light transmitting member 431 and the first airflow generation section 531 do not face each other. As a result, the upper unit 56 can be kept in an open state to clean the inside, thereby increasing convenience of a user.

(9) According to the present embodiment, when the upper unit 56 is opened with respect to the lower unit 55, the second connecting section 59 separates from a second connected section 60 while the first connecting section 57 remains connected to a first connected section 58. As a result, although the duct 46 is connected to the upper unit 56 and the lower unit 55, the second connecting section 59 can be separated from the second connected section 60, so that the upper unit 56 can be opened and maintenance can be easily performed.

(10) According to the present embodiment, when the rotation members 31 and 32 are at the first position P1, the first brush 63 is in contact with the light transmitting member 43, and when the rotation members 31 and 32 are at the second position P2, the first brush 63 is not in contact with the light transmitting member 43. As a result, dust such as paper dust clinging to the light transmitting member 43 can be cleaned by the first brush 63.

(11) According to the present embodiment, when the rotation members 31 and 32 move from the second position P2 to the first position P1, the first brush 63 comes into contact with the light transmitting member 43, and then the hole section 53 passes through a position facing the light transmitting member 43. As a result, after the light transmitting member 43 is cleaned by the first brush 63, the airflow blown out from the hole section 53 allows more effective cleaning.

(12) According to the present embodiment, when the image of the medium 3 is read, the rotation members 31 and 32 rotate to position so that the white background section 91 or the black background section 92 faces the light transmitting member 43. As a result, it is possible to switch between the white background section 91 and the black background section 92 in accordance with the type of the medium 3.

(13) According to the present embodiment, the hole section 53 is arranged between the white background section 91 and the black background section 92 in the transport direction F when the rotation members 31 and 32 are at the first position P1. As a result, after the light transmitting member 43 is cleaned by the airflow, then whichever of the white background section 91 and the black background section 92 is caused to face the light transmitting member 43 by rotating the rotation members 31 and 32, it can be positioned to face the light transmitting member 43 using substantially the same rotation amount.

(14) According to the present embodiment, since a color reference member 64 is arranged on an opposite side of the shaft 11 from the hole section 53, dirt such as dust blown by the airflow is less likely to contaminate as compared with a case where a color reference member 64 is arranged on another section.

(15) According to the present embodiment, at least a part of the first reading section 51 overlaps the second rotation member 32 when viewed from the transport direction F, and at least a part of the second reading section 52 also overlaps the first rotation member 31 when viewed from the transport direction F. That is, since the first reading section 51 and the second reading section 52 are not arranged so as to face each other in the vertical direction, but are arranged so as to be offset from each other, it is possible to arrange the first rotation member 31 and the second rotation member 32 on the facing sides of the first reading section 51 and the second reading section 52, thereby suppressing an increase in the size in a height direction.

(16) According to the present embodiment, since the first rotation member 31 and the second rotation member 32 are rotated by the second drive source 27, which is the common drive source, it is possible to suppress an increase in size as compared with a case where another drive source is used.

(17) According to the present embodiment, the first brush 63 is configured to come into contact with the transport assistance sections 61 and 62 at a position different from the first position P1 and the second position P2 of the rotation members 31 and 32 and clean the transport assistance sections 61 and 62. As a result, the first brushes 63 provided on the rotation members 31 and 32 can be used to clean the transport assistance sections 61 and 62.

(18) According to the present embodiment, the transport path 2 includes the straight path 68 and the curved inversion path 18, and the discharge receiving section 16 that receives the medium 3 discharged from the curved inversion path 18 is arranged above the straight path 68. As a result, it is possible to suppress an increase in the size of the device in a height direction.

(19) According to the present embodiment, the first rotation member 31 and the second rotation member 32 are rotated in the same rotational direction when the first rotation member 31 and the second rotation member 32 are rotated while airflow is blown out from the hole section 53. As a result, it is possible to suppress dust blown by airflow from clinging to the reading section on one side.

Second Embodiment

Next, the image reading device 1 according to a second embodiment will be described with reference to FIG. 8. The same sections as those in the first embodiment are denoted by the same reference numerals, and the description of the configuration and the corresponding effects is omitted.

Figure 8:
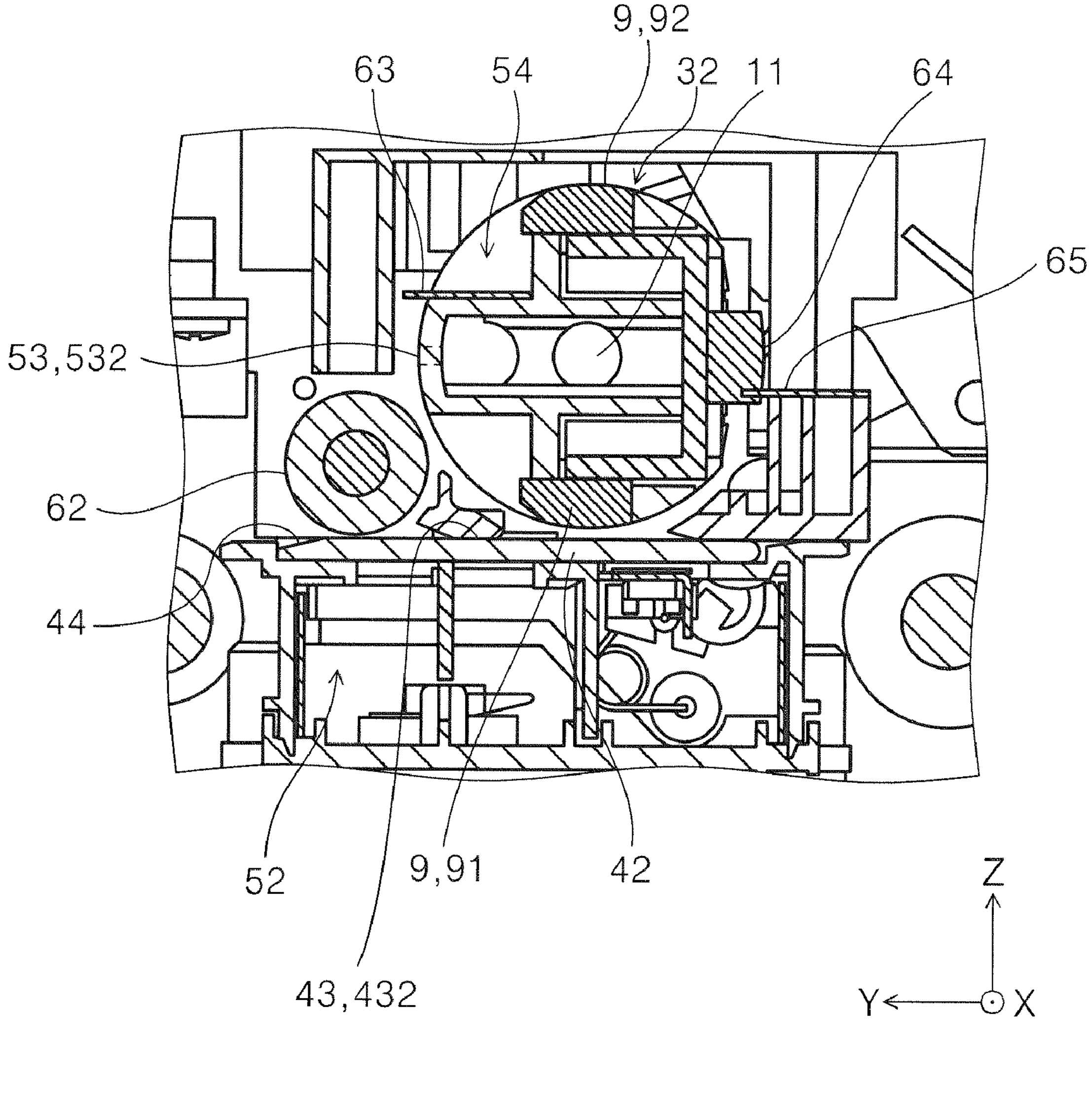
FIG. 8 is a side cross-sectional view of a main part of a second embodiment.

As shown in FIG. 8, in the present embodiment, the color reference members 64 provided on the first rotation member 31 and the second rotation member 32 and having a uniform reflectivity, and the second brushes 65 which clean the color reference members 64 are provided. The color reference member 64 is arranged on the opposite side of the shaft 11 from the hole sections 53.

The first rotation member 31, the second rotation member 32, the first transport assistance section 61, and the second transport assistance section 62 are integrally connected to each other by a pair of coupling members 17 (refer to FIGS.

6A and 6B) located on one end side and the other end side in the width direction of the medium 3, which is the longitudinal direction (X-axis direction) of the first rotation member 31, the second rotation member 32, the first transport assistance section 61, and the second transport assistance section 62. By this integration, the first rotation member 31, the second rotation member 32, the first transport assistance section 61, and the second transport assistance section 62 are configured to integrally move in an upward direction (+Z direction) via the coupling member 17. The second brush 65 is fixed to the coupling member 17.

The second brush 65 is configured to be able to clean the color reference member 64 when the first rotation member 31 and the second rotation member 32 are rotated and come into contact with the color reference member 64.

According to the present embodiment, the second brush 65 cleans the color reference member 64 when the rotation members 31 and 32 rotate and come into contact with the color reference member 64. As a result, dust such as paper dust clinging to the color reference member 64 can be cleaned by the second brush 65.

Since the color reference member 64 is arranged on the opposite side of the shaft 11 from the hole section 53, dirt such as dust blown by the airflow is less likely to contaminate as compared with a case where the color reference member 64 is arranged on another section.

Third Embodiment

Next, the image reading device 1 according to a third embodiment will be described with reference to FIG. 9. The same sections as those in the first embodiment and the second embodiment are denoted by the same reference numerals, and the description of the configuration and the corresponding effects is omitted.

Figure 9:
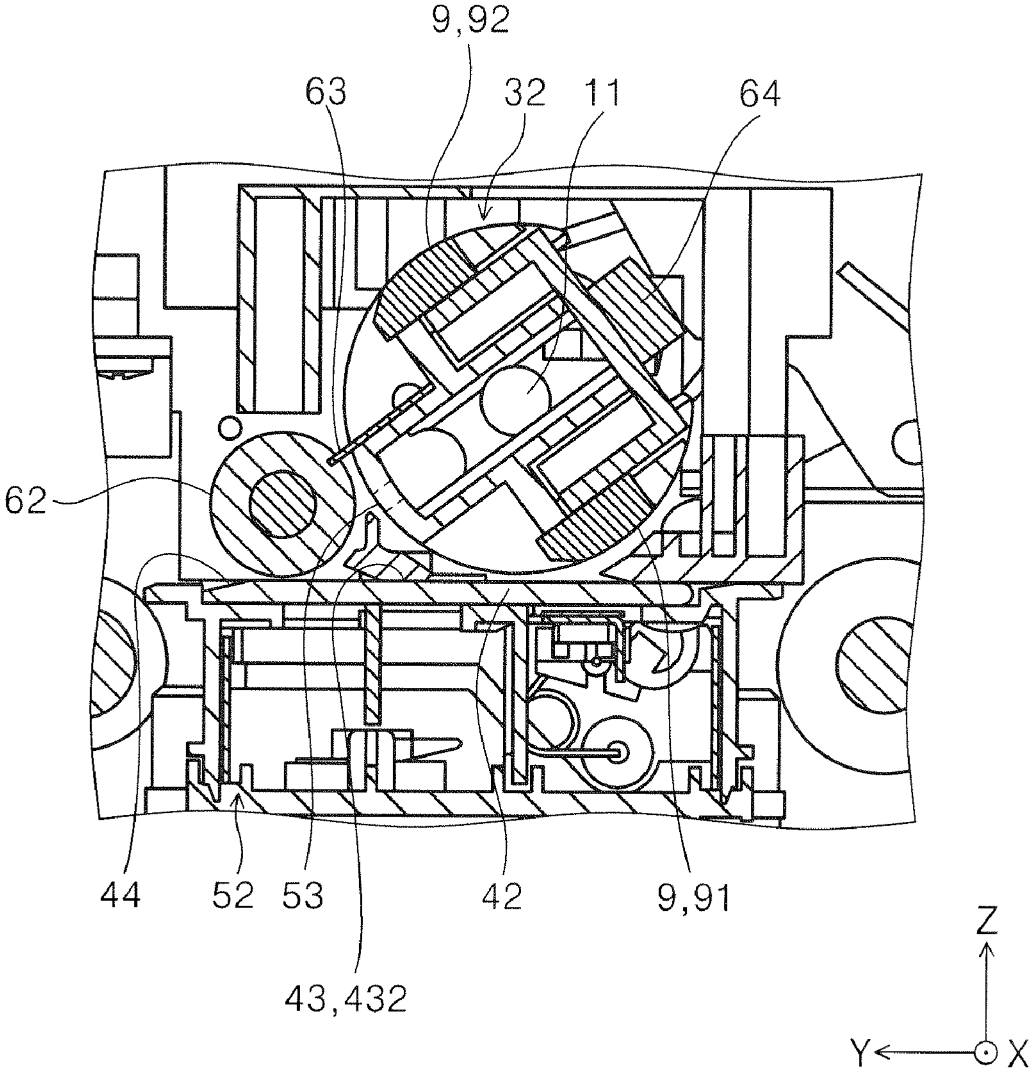
FIG. 9 is a side cross-sectional view of a main part of a third embodiment.

As shown in FIG. 9, in the present embodiment, the first transport assistance section 61 and the second transport assistance section 62 are provided that face the first light transmitting member 431 and the second light transmitting member 432, that are arranged upstream of the first rotation member 31 and the second rotation member 32, and that assist transport of the medium 3. The hole section 53 of the airflow generation section 54 is configured such that when the first rotation member 31 and the second rotation member 32 are at a third position P3 (the position in FIG. 9) different from the first position P1 and the second position P2, the hole section 53 faces the first transport assistance section 61 and the second transport assistance section 62 so that the first transport assistance section 61 and second transport assistance section 62 can be cleaned by airflow generated from the hole section 53.

When the second transport assistance section 62 is rotated in a state of the third position P3, both the cleaning by the first brush 63 and the cleaning by the airflow can be received.

According to the present embodiment, when the rotation members 31 and 32 are at the third position P3, which is different from the first position P1 and the second position P2, the airflow generation section 54 is configured such that the hole section 53 faces the transport assistance sections 61 and 62 so that the transport assistance sections 61 and 62 can be cleaned by airflow generated from the hole section 53. Thus, the airflow generation section 54 can clean the transport assistance sections 61 and 62.

Fourth Embodiment

Next, the image reading device 1 according to a fourth embodiment will be described with reference to FIG. 7. The same sections as those in the first to third embodiments are denoted by the same reference numerals, and the description of the configuration and the corresponding effects are omitted.

Figure 7:
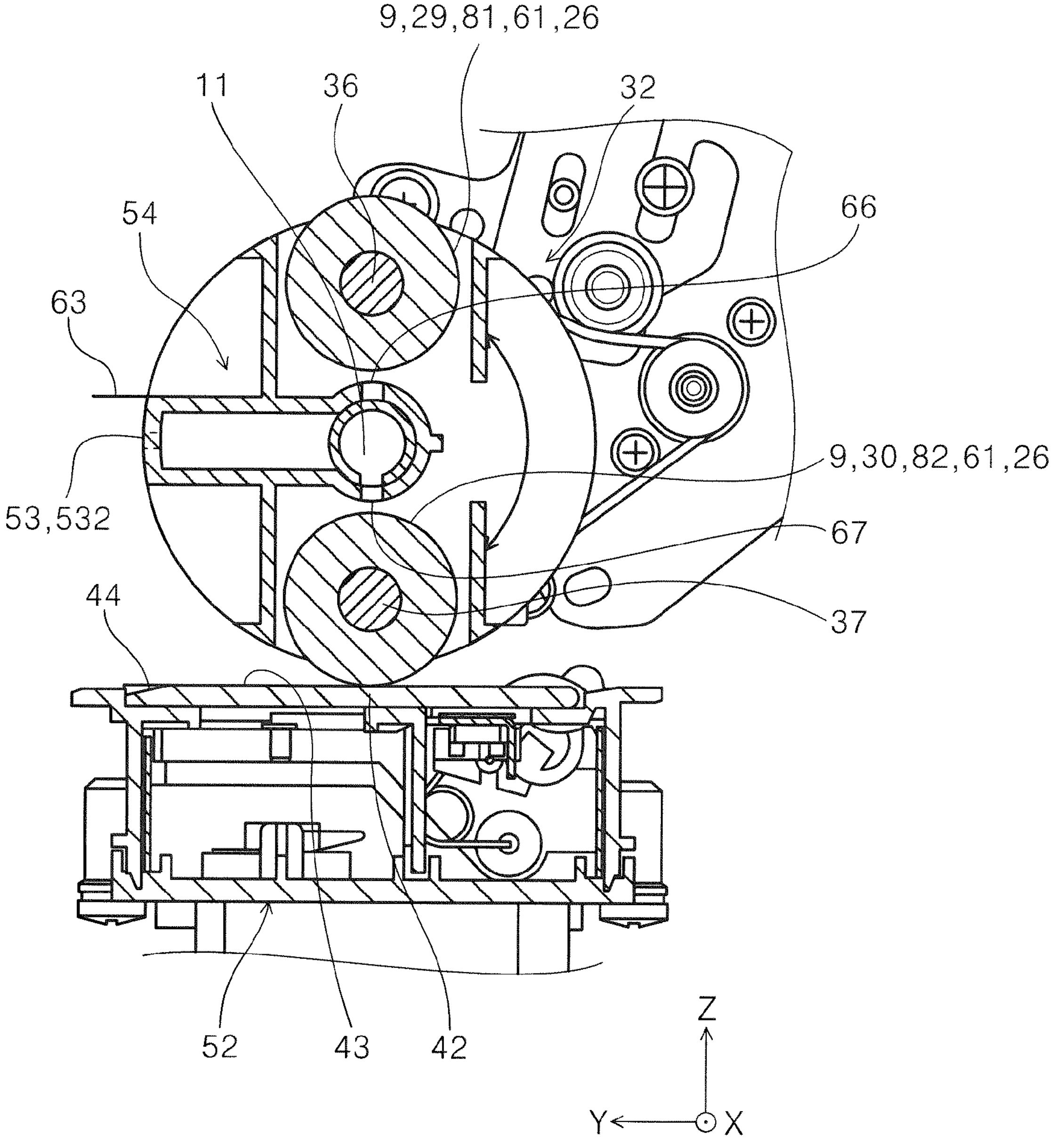
FIG. 7 is a side cross-sectional view of a main part of a fourth embodiment.

As shown in FIG. 7, in the present embodiment, the first rotation member 31 and the second rotation member 32 includes a rotation white background section 81 configured to rotate about a first rotation shaft 36 different from the shaft 11 and the rotation black background section 82 configured to rotate about a second rotation shaft 37 different from the shaft 11 and the first rotation shaft 36 at positions different from the hole section 53. Here, the rotation white background section 81 and the rotation black background section 82 are constituted by a drive roller 26 having a cylindrical outer shape, include a white peripheral surface 29 and a black peripheral surface 30, and rotate by power transmitted from the first drive source 15 by a power transmission mechanism (not shown). The first rotation member 31 and the second rotation member 32 are configured to rotate to a position where the rotation white background section 81 or the rotation black background section 82 faces the light transmitting member 43 when an image of the medium 3 is read.

The rotation white background section 81 and the rotation black background section 82, which are the drive rollers 26, are configured such that when the first rotation member 31 and the second rotation member 32 are rotated about the shaft 11, the power transmission state with the first drive source 15 by the power transmission mechanism is switched to a power non-transmission state.

In the present embodiment, the airflow generation section 54 includes other hole sections 66 and 67 other than the hole section 53. Further, cleaning is performed by blowing airflow from the other hole sections 66 and 67 toward the rotation white background section 81 and the rotation black background section 82 when the first rotation member 31 and the second rotation member 32 are at the second position P2, that is, in a state in which the hole sections 53 do not face the first light transmitting member 431 and the second light transmitting member 432 (FIG. 7).

According to the present embodiment, when the reading sections 51 and 52 read the image of the medium 3, the rotation members 31 and 32 are rotated to position the rotation white background section 81 or the rotation black background section 82 so as to face the light transmitting member 43. As a result, since the rotation white background section 81 and the rotation black background section 82 come into contact with the transported medium 3 while rotating, it is possible to stabilize the transportation of the medium 3 at the time of reading by the reading sections 51 and 52, and thus, reading quality is stabilized.

When the rotation members 31 and 32 are at the second position P2, airflow is blown out from the other hole sections 66 and 67 toward the rotation white background section 81 and the rotation black background section 82. As a result, paper dust clinging to the rotation white background section 81 and the rotation black background section 82 can be removed.

Other Embodiments

Although the image reading device 1 according to the present disclosure basically includes the configuration of the above-described embodiment, it is of course possible to change or omit the partial configuration without departing from the scope of the present disclosure.

In the above embodiment, an image reading device that includes the first reading section 51 and the second reading section 52 as reading sections and can read both sides of the first side and the second side of the medium 3 has been described, but the present disclosure can also be applied to an image reading device including a single-sided reading structure.

In the above embodiment, the airflow generation section 54 is described as a structure for blowing out airflow from the hole sections 53, but the present disclosure is not limited to this. The airflow generation section 54 may be configured to suck airflow from the hole sections 53 to generate airflow in the light transmitting member 43. By adopting this suction structure, it is possible to obtain an effect of not dispersing the cleaned dust to the surroundings in addition to the effect of the blowing structure.

Although the image reading device 1 including the straight path 68 and the curved inversion path 18 in the transport path 2 has been described in the above embodiment, the present disclosure is also applicable to a device including no curved inversion path 18.

What is claimed is:

1. An image reading device comprising:

a reading section configured to read an image of a medium transported in a transport direction;

a light transmitting member arranged between a transport path on which the medium is transported and the reading section;

an airflow generation section that is arranged on an opposite side of the light transmitting member from the reading section, that includes a hole section positioned facing the light transmitting member, and that is configured to generate airflow from the hole section toward the light transmitting member;

a rotation member that is arranged to face the reading section on an opposite side of the light transmitting member from the reading section and that is configured to rotate about a shaft;

a lower unit;

an upper unit configured to open and close relative to the lower unit; and a fan configured to cause the airflow, wherein the airflow generation section is provided to the rotation member, the rotation member is configured to rotate and switch between a first position at which the hole section faces the light transmitting member and a second position at which the hole section stands by at a position farther from the light transmitting member than the first position, the rotation member includes a plurality of the hole sections in a longitudinal direction of the shaft, the reading section includes a first reading section and a second reading section, the light transmitting member includes a first light transmitting member and a second light transmitting member, the rotation member includes a first rotation member including a first airflow generation section and a second rotation member including a second airflow generation section, the first reading section, the first light transmitting member, and the second rotation member are provided above the transport path, the second reading section, the second light transmitting member, and the first rotation member are provided below the transport path, the lower unit includes the second reading section, the second light transmitting member, and the first airflow generation section, the upper unit includes the first reading section, the first light transmitting member, and the second airflow generation section, in a state where the upper unit is closed, the second light transmitting member and the second airflow generation section face each other, and the first light transmitting member and the first airflow generation section face each other, and in a state where the upper unit is open, the second light transmitting member and the second airflow generation section do not face each other, and the first light transmitting member and the first airflow generation section do not face each other, the fan is connected to the airflow generation section via a duct at a longitudinal-direction end section of the shaft, the fan and the duct are attached to the lower unit, a first connecting section of the duct is connected to a first connected section located at a longitudinal-direction end section of the shaft of the first rotation member, a second connecting section of the duct is connected to a second connected section located at a longitudinal-direction end section of the shaft of the second rotation member, and when the upper unit is opened with respect to the lower unit, the second connecting section separates from the second connected section while the first connecting section remains connected to the first connected section.

2. The image reading device according to claim 1, wherein the rotation member includes a plurality of the hole sections in a longitudinal direction of the shaft.

3. The image reading device according to claim 1, wherein at the first position, the hole section generates the airflow from a direction orthogonal to the light transmitting member.

4. The image reading device according to claim 1, wherein the airflow generation section overlaps the light transmitting member when viewed from a vertical direction.

5. The image reading device according to claim 1, further comprising:

a fan configured to cause the airflow, wherein the fan is connected to the airflow generation section via a duct at a longitudinal-direction end section of the shaft.

6. The image reading device according to claim 1, wherein at least a part of the first reading section overlaps the second rotation member when viewed from the transport direction and at least a part of the second reading section overlaps the first rotation member when viewed from the transport direction.

7. The image reading device according to claim 1, wherein the first rotation member and the second rotation member are rotated by a common drive source.

8. An image reading device comprising:

a reading section configured to read an image of a medium transported in a transport direction;

a light transmitting member arranged between a transport path on which the medium is transported and the reading section;

an airflow generation section that is arranged on an opposite side of the light transmitting member from the reading section, that includes a hole section positioned facing the light transmitting member, and that is configured to generate airflow from the hole section toward the light transmitting member; and a rotation member that is arranged to face the reading section on an opposite side of the light transmitting member from the reading section and that is configured to rotate about a shaft wherein the airflow generation section is provided to the rotation member;

the rotation member is configured to rotate and switch between a first position at which the hole section faces the light transmitting member and a second position at which the hole section stands by at a position farther from the light transmitting member than the first position; and the rotation member includes, at positions different from the hole section, a rotation white background section configured to rotate about a first rotation shaft different from the shaft and a rotation black background section configured to rotate about a second rotation shaft different from the shaft and the first rotation shaft, and when the medium is read, the rotation member rotates to position so that the rotation white background section or the rotation black background section faces the light transmitting member.

9. The image reading device according to claim 8, wherein the reading section includes a first reading section and a second reading section, the light transmitting member includes a first light transmitting member and a second light transmitting member, the rotation member includes a first rotation member including a first airflow generation section and a second rotation member including a second airflow generation section, the first reading section, the first light transmitting member, and the second rotation member are provided above the transport path, and the second reading section, the second light transmitting member, and the first rotation member are provided below the transport path.

10. The image reading device according to claim 9, further comprising:

a lower unit and an upper unit configured to open and close relative to the lower unit, wherein the lower unit includes the second reading section, the second light transmitting member, and the first airflow generation section, the upper unit includes the first reading section, the first light transmitting member, and the second airflow generation section, in a state where the upper unit is closed, the second light transmitting member and the second airflow generation section face each other, and the first light transmitting member and the first airflow generation section face each other, and in a state where the upper unit is open, the second light transmitting member and the second airflow generation section do not face each other, and the first light transmitting member and the first airflow generation section do not face each other.

11. The image reading device according to claim 8, further comprising:

a first brush provided on the rotation member and configured to clean the light transmitting member, wherein when the rotating member is at the first position, the first brush is in contact with the light transmitting member, and when the rotation member is at the second position, the first brush is not in contact with the light transmitting member.

12. The image reading device according to claim 11, wherein when the rotation member moves from the second position to the first position, the first brush comes into contact with the light transmitting member, and then the hole section passes through a position facing the light transmitting member.

13. The image reading device according to claim 8, further comprising:

a color reference member provided on the rotation member and configured to have a uniform reflectance and a second brush configured to clean the color reference member, wherein the second brush cleans the color reference member by coming into contact with the color reference member when the rotation member rotates.

14. The image reading device according to claim 13, wherein the color reference member is arranged on an opposite side of the shaft from the hole section.

15. The image reading device according to claim 8, wherein the airflow generation section includes another hole section, and generates airflow from the other hole section toward the rotation white background section and the rotation black background section when the rotation member is at the second position.

16. The image reading device according to claim 8, wherein the transport path includes a straight path in which the reading section is arranged, and a curved inversion path located downstream of the straight path and a discharge receiving section that receives the medium discharged from the curved inversion path is arranged above the straight path.

17. The image reading device according to claim 8, wherein the rotation member includes a plurality of the hole sections in a longitudinal direction of the shaft.

18. The image reading device according to claim 8, wherein at the first position, the hole section generates the airflow from a direction orthogonal to the light transmitting member.

19. The image reading device according to claim 8, wherein the airflow generation section overlaps the light transmitting member when viewed from a vertical direction.

20. The image reading device according to claim 8, further comprising:

a fan configured to cause the airflow, wherein the fan is connected to the airflow generation section via a duct at a longitudinal-direction end section of the shaft.

* * * * *